United States Patent
Lupien et al.

(10) Patent No.: US 6,389,008 B1
(45) Date of Patent: May 14, 2002

(54) INTEGRATED RADIO TELECOMMUNICATIONS NETWORK AND METHOD OF INTERWORKING AN ANSI-41 NETWORK AND THE GENERAL PACKET RADIO SERVICE (GPRS)

(75) Inventors: Francis Lupien, Montreal; Paul Lee, St-Lazare, both of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/217,385

(22) Filed: Dec. 21, 1998

(51) Int. Cl.[7] .......................... H04L 12/66; H04Q 7/24; H04Q 7/20
(52) U.S. Cl. ........................ 370/352; 370/338; 455/433; 455/466
(58) Field of Search .................... 370/352–356, 370/328, 329, 400, 465–467, 349, 337, 338, 312, 310; 455/433, 435, 453, 456, 332, 466, 445

(56) References Cited

U.S. PATENT DOCUMENTS

| | | | |
|---|---|---|---|
| 5,533,019 A | * 7/1996 | Jayapalan | 370/352 |
| 5,590,133 A | * 12/1996 | Billstrom et al. | 370/349 |
| 5,729,536 A | 3/1998 | Doshi et al. | 370/328 |
| 5,734,979 A | * 3/1998 | Lu et al. | 370/328 |
| 5,862,481 A | * 1/1999 | Kulkarni et al. | 370/328 |
| 5,966,378 A | * 10/1999 | Hamalainen | 370/348 |
| 5,978,368 A | * 11/1999 | Hjelm et al. | 370/347 |
| 6,002,689 A | * 12/1999 | Christie et al. | 370/401 |
| H1836 H | * 2/2000 | Fletcher et al. | 455/433 |
| 6,061,346 A | * 5/2000 | Nordman | 370/352 |
| 6,097,950 A | * 8/2000 | Bertacchi | 455/432 |
| 6,104,929 A | * 8/2000 | Jose et al. | 455/445 |
| 6,112,084 A | * 8/2000 | Sicher et al. | 455/426 |
| 6,119,012 A | * 9/2000 | Amirijoo | 455/456 |
| 6,122,263 A | * 9/2000 | Dahlin et al. | 370/329 |
| H1895 H | * 10/2000 | Hoffpauir et al. | 455/433 |

FOREIGN PATENT DOCUMENTS

| | | |
|---|---|---|
| EP | 0 821 507 A2 | 1/1998 |
| WO | WO 97/15157 | 4/1997 |
| WO | WO 97/21313 | 6/1997 |
| WO | WO 97/22216 | 6/1997 |
| WO | WO 97/38544 | 10/1997 |
| WO | WO 97/48251 | 12/1997 |

* cited by examiner

Primary Examiner—Ajit Patel
Assistant Examiner—Hanh Nguyen
(74) Attorney, Agent, or Firm—Smith, Denamraj & Youst, P.C.; Sandra Beauchesne (57) ABSTRACT

An integrated radio telecommunications network which integrates an ANSI-41 circuit switched network and a General Packet Radio Service (GPRS) packet data network to support a mobile station which operates in both the ANSI-41 network and the GPRS network. An interworking function interfaces a mobile switching center (MSC) in the ANSI-41 network with a serving GPRS switching node (SGSN) in the GPRS network by mapping circuit switched signaling utilized by the MSC into GPRS packet switched signaling utilized by the SGSN, and mapping GPRS packet switched signaling into circuit switched signaling. An interworking GPRS base station controller interfaces the SGSN with a GPRS/ANSI-136 base station which supports both ANSI-136 operations and GPRS operations. The interworking GPRS base station controller adapts the traffic signaling format utilized by the SGSN into an air interface traffic signaling format utilized by the GPRS/ANSI-136 base station. An authentication center interface passes the authentication state of the mobile station between an ANSI-41 home location register/authentication center (HLR/AC) in the ANSI-41 network, and a GPRS home location register/authentication center (HLR/AUC) in the GPRS network.

10 Claims, 4 Drawing Sheets

INTEGRATED RADIO TELECOMMUNICATIONS NETWORK AND METHOD OF INTERWORKING AN ANSI-41 NETWORK AND THE GENERAL PACKET RADIO SERVICE (GPRS)

BACKGROUND OF THE INVENTION

1. Technical Field of the Invention

This invention relates to telecommunication systems and, more particularly, to an integrated radio telecommunications network which interworks circuit switched services and packet switched services, and to a method of interworking an ANSI-41 radio telecommunications network and the General Packet Radio Service (GPRS) packet data network.

2. Description of Related Art

Two approaches to data switching are circuit switching and packet switching. Plain old telephone service (POTS) and cellular voice services, for example, use circuit switching. Fixed circuit switching paths are set up between the parties involved in a call by exchanging signaling messages which contain the parties' addresses and request the establishment of a physical switching path. The signaling messages are exchanged between the addressees and switching centers, and between switching centers. The switch(es) respond to the requests in the signaling messages by establishing the physical switching path between the addressees. A data switch can be set up in a similar manner to provide circuit switched data services.

Packet switching, on the other hand, utilizes data packets which are comparatively short blocks of message data. The packets may be of fixed length as in asynchronous transfer mode (ATM), or may be of variable length as in frame relay or the Internet protocol (IP). Complete data messages are broken down into short packages, each with a header. These packets may be sent on diverse routes to their eventual destination. Because packets often travel on diverse routes, they may not arrive at the far-end receiving node in sequential order. Thus, the far the end node must have the capability to store incoming packets and rearrange them in sequential order. The destination node reformats the message as it was sent by the originator and forwards it to the final destination user. Packet switching can be considerably more efficient when compared to circuit switching due to the multiplexing effects which make better use of the available transport bandwidth. Each service or user utilizes only the bandwidth it needs, leaving the unused bandwidth for other services/users. A plurality of paths must exist from the originating node to the destination node for in-service performance since an alternate route may be utilized in the event of failure or congestion of a given route.

GPRS is a packet data transmission service which is designed to function with the Global System for Mobile Communications (GSM) to enable mobile stations (MSs) to access both voice/circuit switched and packet data network services. A proposed GPRS packet data standard defines MS service classes and infrastructures to enable MSs to utilize the GPRS network. However, the GPRS standard addresses interworking requirements for GSM, but does not address interworking requirements for radio telecommunications networks based on ANSI/TIA standards such as those utilized throughout most of North America. The network architecture and the interface between the packet-data-specific nodes and the circuit-switched-specific nodes is tailored to GSM. GPRS does not fit within the ANSI-41 network. A system and method of interworking GPRS and ANSI-41 networks is needed so that the full GPRS functionality (e.g., services, interface protocols, node functionality, etc.) can be supported from the perspective of radio access logic, network logic, and service logic in ANSI-41 networks.

Today, ANSI-41 and ANSI-136 networks only provide voice or circuit-switched services. Therefore, an operator cannot benefit from the advantages and flexibility that packet switching provides when the operator is providing Internet access to subscribers utilizing ANSI-41/136-based cellular networks. A dial-up direct access connection or an analog modem connection must be made to the Internet. For a dial-up direct access connection, for example, a circuit-switched connection is provided between a MS and an Internet access gateway. A call is set up to the gateway, and then a Transaction Control Protocol/Internet Protocol (TCP/IP) session to an Internet provider is set up on top of that connection. This solution does not provide the benefits of multiplexing over the air interface and through circuit switching facilities since dedicated resources are utilized for the duration of the Internet connection. This is very inefficient since, in a typical Internet connection, packets of data are not continuously being sent over the connection. Thus, a voice channel over the air interface is tied up for the duration of the Internet connection, and associated circuit-switched resources over the network are not optimally utilized.

The existing solution is also not very flexible in terms of packet data network access because only one connection can be made at a time. It is not possible to make multi-party call connections for data calls in the way that multi-party voice connections can be made. Thus, simultaneous circuit switched voice and data services cannot be provided while connected through a circuit-switched connection to the Internet. If a voice call is routed to a mobile station during an Internet session, the subscriber cannot take the call and then resume the Internet connection in a seamless fashion. The voice call must be rejected, routed to voice mail, or routed to another number. Additionally, the user cannot originate voice calls during a data call because the data call is circuit-switched between the mobile station and the Internet access gateway.

In order to overcome the disadvantage of existing solutions, it would be advantageous to have a method of integrating GPRS packet switched services and infrastructure with the ANSI-41 circuit switched services and infrastructure, thus enabling similar services to those available in GSM. The present invention provides such a method and integrated network.

SUMMARY OF THE INVENTION

In one aspect, the present invention is a method of integrating a circuit switched radio telecommunications network having a circuit switched serving node, with a packet switched data network having a packet switched serving node. The method includes the steps of (1) providing a first interface between the circuit switched serving node and an interworking function, (2) mapping in the interworking function, signaling from the circuit switched service node into signaling in a standard packet data network protocol, and (3) sending the mapped signaling from the interworking function to the packet switched serving node utilizing the standard packet data network protocol. In one embodiment, the circuit switched radio telecommunications network is an ANSI-41 radio telecommunications network, and the packet switched data network is a General Packet Radio Service (GPRS) packet data network. The circuit switched service node is a mobile switching center/visitor location register (MSC/VLR) which may be a serving MSC or a gateway MSC. The packet switched service node is a serving GPRS switching node (SGSN).

The method may also comprise the step of connecting to the MSC/VLR, a GPRS/ANSI-136 base station which operates in accordance with both ANSI-136 standards and GPRS standards. A second interface is provided between the SGSN and an interworking GPRS base station controller which adapts a signaling format utilized on the second interface into an air interface signaling format. The adapted signaling is sent from the interworking GPRS base station controller to the GPRS/ANSI-136 base station over a traffic interface. The traffic interface passes through a semi-permanent connection in the MSC/VLR. A third interface is provided between the interworking GPRS base station controller and the MSC/VLR to connect a radio resource management entity (RRME) in the MSC/VLR with an associated component in the interworking GPRS base station controller.

The method further comprises providing an authentication center interface between an ANSI-41 home location register/authentication center (HLR/AC) and a GPRS home location register/authentication center (HLR/AUC). The authentication state of a mobile station operating in both the ANSI-41 network and the GPRS network is sent between the ANSI-41 HLR/AC and the GPRS HLR/AUC utilizing the authentication center interface.

In another aspect, the present invention is an integrated radio telecommunications network which interworks an ANSI-41 circuit switched network and a General Packet Radio Service (GPRS) packet data network. The integrated radio telecommunications network includes a mobile switching center/visitor location register (MSC/VLR) in the ANSI-41 network that provides circuit switched services to a mobile station which operates in both the ANSI-41 network and the GPRS network, and a serving GPRS switching node (SGSN) in the GPRS network that provides packet switched services to the mobile station. An interworking function interfaces the MSC/VLR with the SGSN by mapping control signaling utilized by the MSC/VLR into GPRS packet switched signaling utilized by the SGSN, and mapping GPRS packet switched signaling into circuit switched signaling. An interworking GPRS base station controller interfaces the SGSN with a GPRS/ANSI-136 base station which supports both ANSI-136 operations and GPRS operations. The interworking GPRS base station controller adapts a signaling format utilized by the SGSN into an air interface signaling format utilized by the GPRS/ANSI-136 base station. An interface is provided between the interworking GPRS base station controller and the MSC/VLR to connect a radio resource management entity (RRME) in the MSC/ VLR with an associated component in the interworking GPRS base station controller.

The integrated network may also include an ANSI-41 HLR/AC, and a GPRS HLR/AUC. An authentication center interface between the ANSI-41 HLR/AC and the GPRS HLR/AUC sends the authentication state of the mobile station between the ANSI-41 HLR/AC and the GPRS HLR/AUC.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

As noted above, GPRS is a packet data transmission service which is designed to function with the GSM system to enable mobile stations to access both voice/circuit switched and packet data network services. The present invention defines the interface requirements to utilize GPRS with ANSI-41/ANSI-136 networks. The interface does not involve a straight reuse of the GSM interface because the GPRS service reuses part of the GSM network functions. Thus, the interface is different and more complicated with ANSI-41 networks. In particular, there are significant differences between the signaling involved in authentication and location updates.

When defining an interface between GPRS and ANSI-41 networks, alternative approaches are possible since the GPRS service reuses part of the GSM network functions. In a first approach, some of the GSM network functions are migrated to the ANSI-41 network. For example, for authentication services, the functionality of the GSM authentication center may be implemented in the ANSI-41 network. In this way, GPRS nodes and network functionality are, to a high degree, left intact, but the ANSI-41 nodes and network functionality are greatly impacted. Alternatively, the GPRS infrastructure may be modified to remove the GSM logic from the GPRS nodes and network functionality, and to implement ANSI-41 logic into them. For example, the GPRS functionality may be modified so that it does not reuse the GSM authentication center to provide authentication services, but instead, uses the ANSI-41 authentication center to provide services to the GPRS network.

The preferred embodiment keeps the amount of integration as low as possible by maintaining the integrity of each network function and node on both the GPRS side of the interface and the ANSI-41 side. The problem with attempting more extensive integration is that the two systems originate from two different standards, and have different evolutionary paths. Therefore, it is advantageous to limit the amount of GSM functionality that is integrated into the ANSI-41 infrastructure since future GSM/GPRS developments could cause major integration problems in ANSI-41 networks. Additionally, decoupling the networks to the greatest degree is the most efficient way to provide independent paths for system evolution. This allows for future growth of both networks.

The radio air interface in the ANSI-41/GPRS integrated system is based on ANSI-136, which is obviously different from the GSM/GPRS air interface. The present invention reuses the interfaces between the critical nodes in the GPRS architecture and the ANSI-41 nodes. This is also done to provide integration of packet data and voice services in an efficient way.

I. ANSI-41/136 Description
A. Radio Resource Handling

It is useful to define some terms utilized in the following description of the radio network configuration (corresponding to the RR sub-layer). A MSC service area is a grouping of cells with associated carriers and channel functions controlled by a MSC. A voice/circuit switched service area is a subset of a MSC service area.

An ANSI-136 MSC service area or exchange area is built with a number of cells, each cell supporting a number of channel functions. Characteristics of the voice/circuit switched service area within the ANSI-136 MSC service area are as follows:

1. The MSC service area can be divided into a number of location areas (LAs). Each location area is built from a number of cells, and is associated with a voice/circuit switched service area;
2. Both the MSC service area and the location areas are seen by mobile stations as registration areas, and are utilized in the location tracking Mechanism;
3. The MSC service area may also be divided into a number of paging areas (PA), built from a number of location areas. Typically an LA has an associated PA. A PA is associated with voice/circuit switched service areas.
4. Both LAs and PAs can be utilized for paging mobile stations;
5. The MSC has a neighbor MSC, and the neighbor MSC's service area may be expressed by defining a satellite paging area (SPA). A SPA is associated with a voice/circuit switched service area. A SPA in a neighbor MSC is tied to a PA in the MSC.

B. Mobility Management (MM)

1. Location Tracking in MSC Service Area

From the cellular network point of view, mobility management has a set of rules based on a hierarchical node model. The rules are designed to limit network interaction in order to minimize ambiguity in the true location of mobile stations. A central HLR supervises mobile station mobility between VLRs, and a central VLR supervises mobile station mobility between one or more serving MSC/VLRs. Therefore all execution rules for cellular services and other functions (e.g., authentication) are based on the established MM network concept.

The location of a mobile station within a serving system service area is kept track of by forcing the mobile station to report its location. The mobile station reports its location through a "geographic" registration mechanism when crossing predefined geographical areas. Typically, such geographical areas are built from LAs and are identified to mobile stations through broadcast LOCAREA and System Identification (SID) parameters. In the present invention, the LA is kept track of in the VLR at mobile station registration accesses, independently of registration type (i.e., independent of the event that triggered the registration access). This process ensures that the most up-to-date LA is utilized for paging. Typically this LA is used in the first page attempt to a mobile station. The LA may also point to a PA. The PA and whole service area can potentially be used in paging the mobile station on subsequent attempts when no response to a first (or second) page attempt is received. Activity of a mobile station is kept track of by forcing the mobile station to register at power-up, power-down, and at a constant interval while active through a periodic registration mechanism.

2. Location Tracking Across MSC Service Areas

Location of a mobile station across service areas (VLR id, MSC id, etc.) is kept track of by forcing the mobile station to register. The SID typically identifies the system operator, and therefore marks a system area boundary. MSC boundaries within the same SID area are identified as different LAs since is it essential that mobile stations report their location when crossing service area borders. A first registration access in a service area causes the following:

a. The serving system's MSC and the VLR-functions determine that the mobile station is not active and not authenticated. An authentication transaction towards the AC is then launched. From the IS-41 network perspective, there is a difference between subscriber validation and subscriber authentication.
b. Upon successful mobile station authentication, the mobile station location (LA, MSC id, VLR id) is updated in the serving system's database and the home system's database through transaction procedures towards the VLR and HLR.
c. If the mobile station was active in another service area prior to the first access, the old serving system area VLR and MSC may be polled by the AC to fetch the authentication call history "count". The HLR then requests the old serving system to remove the mobile station from the active list by launching a registration cancellation transaction.

C. ANSI-41 Network Authentication and Security Procedures

The security process in ANSI-41 networks is based on iterations of a single algorithm (CAVE) to generate and update the Shared Secret Data (SSD) (authentication and ciphering keys), for access authentication. The security process also involves validation of network parameters such as "count". The SSD-generation process involves three iterations: SSD, AUTHU (for unique challenge), and AUTHBS (for BS challenge). Subsequently, each mobile station access requires one iteration for the generation of the ANSI-41 Authentication Response (AUTHR). The SSD generation is triggered by the AC, and is based on A-key and random number generation. One random number is common between the AC and the mobile station (RANSSD) and is generated by the AC at SSD generation time. The random number used for unique challenge (RANDU) may be generated at the AC or at the MSC/VLR when the SSD is shared. In the latter case, AUTHU and AUTHBS computations are also local to the MSC/VLR. The generation of AUTHR is based on SSD, RAND, and dialed digits etc. RAND is assumed to be generated locally at the MSC level, and broadcast on the overhead message train (OMT) or Broadcast Control Channel (BCCH). When SSD is not shared, authentication occurs at the AC and both the mobile station's AUTHR and RAND are sent to the AC. When SSD is shared, the AUTHR computation and validation are performed at the MSC/VLR.

II. GPRS Description

In the description that follows, the term "simultaneous" expresses the requirement to simultaneously support GPRS packet switched services, circuit switched services, and Short Message Service (SMS) services. The range of MS services considered "standard" GPRS functions is as follows:

Simultaneous initial registration (International Mobile Station Identification (IMSI) attach and GPRS attach), simultaneous activation (packet data services and circuit switched services);

Simultaneous monitoring (circuit switched and packet switched services on only one control channel);

Simultaneous invocation of circuit switched calls and packet channel transactions. Some subscribers may have limited simultaneous invocation (on-hold type of approach is used for one of the invocations);

Simultaneous traffic (on same or different frequencies). Some subscribers do not have this capability (i.e., no simultaneous traffic); and Some subscribers may only use circuit switched and packet switched services alternatively, when both services are supported.

The GPRS standard specifies the GPRS core functions as being independent functional entities from the existing GSM circuit switched services core functions, while allowing for the GSM and GPRS functions to interwork for support of circuit switched services during packet data transactions. The intent of the specification is to introduce GPRS functions that are not built upon or invoking GSM core circuit switched services functions in order to deliver packet switched services.

Mobile station service class requirements must be supported through the integration of GPRS in the ANSI-41 reference network. The integration must involve the radio access logic, network logic, and service logic. This mandates impacts on infrastructure, node functionality, and interface protocols for (1) radio access and resource handling, (2) data path connection with GPRS-upgraded ANSI-136 radio access functions, and (3) service control and mobility handling with ANSI-41 nodes and node functionality through signaling protocol interfaces. From the perspective of the radio frequency physical link, and the radio resource management sub-layer, ANSI-136-specific radio frequency and radio resource management functionality may be integrated in the GPRS architecture. From a network and service logic perspective, the impact on the ANSI-41 architecture in term of functions, messages/interfaces, and transport media varies depending on the degree of integration that is attempted.

The GPRS logical functional architecture is based on the same functional layering principles as found in the GSM functional architecture. The most important functional plane defines the layer 3 functions, or as they are referred to in the GPRS standard, the layer 3 sub-layers and their associated entities. There are four sub-layers in the GPRS protocol architecture: Radio Resource (RR) Management, Logical Link Control (LLC), Mobility Management (MM), and Connection Management (CM). Layer 3 sub-layers are functionally orthogonal for GPRS services and for non-GPRS services. The important sub-layer entities are briefly described below. Typically, each sub-layer entity is defined by only one protocol between the peer protocol entities in the mobile station and in the network.

A. RR Sub-Layer

The RR sub-layer is composed of the following functional blocks:
1. RR dedicated mode entity for non-GPRS services; and
2. GPRS RR Shared mode (Radio Link Control/Medium Access Control (RLC/MAC)) for GPRS services.

A packet data service area is a grouping of cells where the associated packet data functions are controlled by a SGSN. Typically, this is a subset of a MSC service area. A Serving GPRS Switching Node (SGSN) service area is a packet data service area, and may consist of an overlay of one or more entire MSC service areas. The SGSN service area may also be an overlay of a subset of a MSC service area. Cells in the SGSN service area have support for GPRS packet data channel (PDCH) channel function(s). Characteristics of the SGSN packet data service area within the ANSI-136 MSC service area are as follows:

A SGSN service area is built from a number of routing areas (RA). A RA is a packet data service area, and is identified by a RA code (RAC);

RAs that are built from a number of cells having support for GPRS PDCH channel functions;

A GPRS RAC is tied to a voice/circuit switched services location area (LAI=LA Id.) in a unique relationship: RAI=RAC+LAI, (RAI=RA Id). LAI represents the overlay of the Voice/circuit switched service area and the packet data service area; and RAs are sized to fit an area smaller or equal to a GSM LA in order to better control the paging load due to incoming GPRS traffic.

B. LLC Sub-Layer

The LLC sub-layer includes a number of functional blocks which handle Quality of Service (QoS) and signaling traffic. The LLC sub-layer is responsible for transporting higher layer information between the Serving GPRS Switching Node (SGSN) and the mobile station.

C. MM Sub-Layer

The MM sub-layer includes the following blocks:

Non-GPRS services mobility (MM entity);

GPRS mobility (GMM entity); and

GMM anonymous access (GMM-AA entity). GMM and GMM-AA are implemented with peers in the SGSN, and mobile station only. MM is implemented with peers in the MSC/VLR and mobile station.

GMM common procedures include Temporary Link Layer Identifier (TLLI) Assignment, Packet Temporary Mobile Station Identification (P-TMSI) Allocation, GPRS Authentication and ciphering, GPRS Identification, and GPRS Information, and are initiated by the network once a PDP context is established.

GMM-specific procedures include:

A procedure initiated by the network or mobile station and used to detach the IMSI in the network for GPRS services and/or non-GPRS services and to release a GMM context: GPRS detach.

A procedure initiated by the mobile station and used to attach or detach the IMSI in the network for GPRS services and/or for non GPRS services and to establish or release the GMM context: GPRS Attach, Combined Attach, GPRS detach and combined GPRS detach.

A procedure initiated by the mobile station once a GMM context has been established, and used to maintain the mobility context (states, location, etc.) synchronously in the mobile station and the network: RA Updates, combined RA updates and Periodic RA updates.

1. Location Tracking Within and Across GPRS Service Areas

Depending on the mobile station class, a mobile station may attach either to IMSI for circuit switched services, GPRS for packet switched services, or both types of services as a combined IMSI/GPRS attach. The attach procedure can be compared to a power-up registration. The detach procedure can be compared to either a power-down or a deregistration procedure. While roaming in packet data service areas, GPRS subscribers with Class A or B mobile stations can be attached to the GPRS network and/or the circuit switched network. Subscribers with Class C mobile stations can be attached to the GPRS network only. From the GPRS network perspective, tracking is done whether the mobile station has a terminal operating in Class A/B or Class C. For Class A/B, location updates may be combined RA/LA update procedures or independent RA and LA update procedures, while for Class C, RA location updates are performed. Combined RA/LA updates enable simultaneous updating of the mobile station location for both the voice/circuit switched service area and the packet data service area.

2. Routing Area and Location Area Tracking

Routing Area Identification (RAI) and Location Area Identification (LAI) parameters are broadcast on the GPRS control channel. This allows the mobile station to track MSC/VLR LAs and RAs while in GPRS standby or ready mode. Therefore two independent network processes are involved:

The mobile station detects a new Routing Area (RA) within the current overlaid location area (i.e., a new RAC with LAI unchanged). This triggers a RA update.

The mobile station detects a new Location Area (LA) (i.e., the LAI is different). This triggers a combined RA/LA update since the associated MSC service area may be different, and a new association between the SGSN and the MSC/VLR must be performed.

3. Circuit Switched Service Connection Support in the GPRS Nodes

In order to support circuit switched services in the GPRS network, the following functions are implemented in the SGSN, and some adaptation of tie call control and mobility management functions in the GSM MSC/VLR is performed.

IMSI attach/detach to the MSC/VLR, and GPRS attach/detach indication;

LA updates to the MSC/VLR (including periodic updates);

Paging order to the serving SGSN for circuit switched connection; and

Alert procedures for non-GPRS services.

4. Network Security Functions

Based on existing procedures/algorithms, the GPRS nodes must use identity confidentiality (for example, based on the Temporary Link Layer Identifier (TLLI)), authentication procedures to validate mobile stations, and ciphering keys to encrypt LLC PDUs. A triplet vector must be available to the SGSN along with the ciphering algorithm and the ciphering key sequence number. Subscriber identity confidentiality may be maintained utilizing the Temporary Mobile Station Identifier (TMSI). The TMSI addressing function requires network assignment of a temporary identity to roaming mobile stations. In the scope of GPRS, the MSC/VLR may return a TMSI to the SGSN upon successful LA updating (for MS addressing using TMSI on the SGSN-MS interface). Therefore, as long as the TMSI addressing in the SGSN is optional, a TMSI does not have to be assigned. Otherwise the SGSN must be updated to remove the TMSI optionality.

As noted above, subscriber identity confidentiality may also be maintained utilizing the Temporary Link Layer Identifier (TLLI). TLLI addressing on the LLC protocol requires network assignment of a temporary identity, and is local to the GPRS nodes. TLLIs are assigned at RA updates. In GPRS, subscriber identity confidentiality and TMSI transfer to mobile stations is performed in cipher mode in the location update acknowledgment to the mobile station.

GSM subscriber identity authentication and ciphering requirements include the following:

MS id Key (Ki) and Key generation algorithms (A3, A8) in the AUC and mobile station;

Generation of Security Related Information such as cyphering key (Kc), security result (SRES), and random number (RAND) vectors. The vectors are distributed to the SGSN (and the GSM MSC/VLR). Only RAND is transferred to the mobile station for its internal generation of Kc and SRES upon authentication request from the network; and Typically in GSM, the DCCH and TCH are encrypted with the ciphering key Kc applied with ciphering (deciphering algorithm A5 at the BSS level.

Thus, the sequence of events in the GSM/GPRS network related to security functions is as follows:

a. Upon first access, or at IMSI/GPRS attach, the triplet vector (RAND, SRES, Kc) is generated by the AUC. SRES and Kc are generated using RAND and Ki (equivalent A key). The triplet vector is transferred from the AUC to the MSC/VLR or SGSN. Notice that one iteration is performed of two algorithms in parallel, and no algorithm computation is required in the SGSN or MSC/VLR.

b. The MSC/VLR or SGSN has control over which RAND in the vector is to be used for a given authentication cycle. The RAND is sent to the mobile station (on the air) when authentication is requested by the MSC/VLR or SGSN through an explicit "authentication request" message to the mobile station. An authentication request message follows every location update message from the mobile station (at location or system area registration).

c. The mobile station uses RAND and IMSI to generate SRES, which is forwarded to the BSS/MSC/VLR or SGSN in an "authentication response" message.

d. The mobile station internally generates the Kc using the RAND and Ki. A new Kc is used for ciphering thereafter upon order from the MSC/VLR or SGSN. This happens at every location update.

e. When a mobile station performs a "location update" access in a new MSC/VLR area, the new VLR fetches the vectors from the old VLR.

f. Once all keys have been used in the vector, the MSC/VLR or SGSN requests a new set from the HLR/AUC. Also note that in the GSM architecture, layer 3 messages (control plane) are end-to-end (i.e., mobile station-to-MSC/VLR). The BSS acts as a transport only, except for air interface ciphering where it is directly involved in applying the A5 algorithm. There is no broadcast of RAND etc.

5. Authentication Synchronization Between SGSN and MSC/VLR

While the mobile station is controlled by the GPRS network nodes, the MSC/VLR does not authenticate the mobile station via the SGSN upon attach or location updates. The SGSN and MSC/VLR may independently handle security processing. The MSC/VLR may vary its authentication procedure in relation to circuit switched connection services. The mobile station may use IMSI for call related accesses if no prior TMSI was assigned. Note that call accesses received on the GPRS control channel PCCH are forwarded to the MSC/VLR (not the SGSN). A new RAND is then used to authenticate (generate SRES) and to cipher (generate Kc). There is no need to coordinate the RAND selection between the MSC/VLR and SGSN. The SGSN and MSC/VLR may use the triplet independently.

D. CM Sub-Layer

The CM sub-layer includes functional blocks for GPRS services and functional blocks supporting GPRS short message service control (GSMS). The functional blocks for GPRS services are implemented in the SGSN and mobile station only, and include Session Management (SM) functions. The main role of the SM functions is to support mobile station PDP context handling. The SM functions include procedures for identified PDP context activation, deactivation, and modification as well as anonymous PDP context activation and deactivation. SM procedures for identified access can only be performed if a GMM context has been established between the mobile station and the network. If no GMM context has been established, the MM sub-layer must initiate the establishment of a GMM context by use of the GMM procedures. After GMM context establishment, the SM functions use services which are offered by GMM (see GSM 04.07). Ongoing SM procedures are suspended during GMM procedure execution. For non-GPRS services, the CM sub-layer includes functions such as Call Control (CC) entity, Support for SMS entity, Supplementary Services (SS) entity, Group Call Control entity, and Broadcast Call Control. These functions are implemented in GSM core network nodes only.

For interoperability purposes, a small set of GPRS layer 3 functions were integrated horizontally with the GSM core functions. (Note: The core network functions refers to all GPRS functions with the exception of those in the BSS, mobile terminal (MT), and terminal equipment (TE)). Following the typical functional layering approach, the set of GPRS layer 3 functions includes the following functions.

1. At the MM Sub-Layer:

GSM core network concepts were reused as GPRS specific instances and introduced in the GPRS core network model. These are:

The GPRS-specific home location register (GPRS HLR) for profile and location update handling in the GPRS core network; and The reuse of authentication algorithms from the GSM authentication center (AUC) for generation of a triplet vector. The above functions are supported through a GPRS-specific interface (Gr), modeled on the "D" interface between the GPRS HLR and the SGSN.

MS mobility between GSM and GPRS core networks. To support concurrent or simultaneous access to GSM and GPRS services, mobility functions between the GSM and GPRS networks are integrated at the VLR level. The SGSN is seen as an access node from the GSM serving node perspective. The functional relationship between the GSM MSC/VLR and the SGSN is comparable to that of a subset of an "A interface" (i.e., the Gs interface), and is of much lesser scope than that of the A interface.

MS mobility between the radio access network and the GPRS core network. For mobility management purposes, the relationship between the BSS and the SGSN is similar to that of the BSS and the MSC/VLR. The "mobility context" is maintained through MM signaling between the GPRS core network and the BSS, and involves the uplink transfer of location information (cell identity and radio status) and paging orders on the downlink. MM signaling is conveyed through the Gb interface instead of the A interface. The Gb interface also multiplexes virtual circuits for MS user data and MS user signaling for GPRS mobility management and SMS messaging.

2. At the RR Sub-Layer:

The GPRS core network assumes that packet radio bearer services (GPRS-specific RR layer functions) are available from a BSS radio access node. The management and traffic handling of both circuit switched dedicated mode and packet switched shared mode radio bearers is integrated at the BSS. The shared mode RR is integrated with the dedicated mode RR at the BSC. This includes both management and traffic handling components. At the base station transceiver (BTS) level, the GPRS radio channel structure is added to the existing GSM circuit switched channel definition.

Noting that the HLR and BSS may be GPRS-specific, the GPRS infrastructure may be deployed separately from the GSM circuit switched infrastructure.

III. GPRS/ANSI-41 Integration

The problem, then, in defining an interface between the GPRS service and the ANSI-41/136 network is to reconcile the GPRS RR, MM, SM, and SMS sub-layer entities with their ANSI-41/136 counterparts and integrate the taco systems. There are alternative approaches to this integration process. First, the integration may be performed through a selective horizontal integration of MM and security. This approach preserves the functional integrity of both the GPRS/GSM core network and the ANSI-41 core network and allows them to coexist by maintaining the orthogonality of the distinct GPRS/GSM and ANSI-41 circuit switched networks with interworking at the VLR level for mobility management purposes. A second approach is full vertical integration of MM and security. This may be performed in one of two ways, either by adapting the GPRS nodes to operate with the ANSI-41 authentication and mobility management procedures, or by implementing the GSM requirements for authentication and mobility management, etc., as part of the ANSI-41 core network (functions and messages). If the GPRS nodes are adapted to operate with ANSI-41 procedures, ANSI-41 authentication center algorithms and keys are re-used and implemented in the GPRS mobile terminal and nodes.

In the present invention, a selective horizontal integration is performed. The separation and independence between GPRS and GSM core services functional sub-layer entities and logical nodes provides the basis for defining the GPRS and ANSI-41/ANSI-136 integration. This independence enables the selective horizontal integration to be performed, thus preserving the integrity of each architecture. This approach is flexible since selected parts of sub-layers can be integrated. This approach is also simpler because the required changes are focused on only part of the architecture. The approach is also more efficient than the alternatives because it enables services from both architectures to be provisioned with a low complexity solution.

Therefore, as long as a number of straightforward requirements on network co-existences and interwork are satisfied, it is possible to leverage the existing ANSI-136/41 and GPRS standards to a maximum extent and minimizing standards development and coincidental infrastructure impact on respective systems. The GSM-GPRS architecture described earlier is adapted by replacing the GSM core functions with ANSI-41 and ANSI-136 based circuit switched services infrastructures.

More specifically, the GSM core network logical nodes (MSC/VLR, HLR, AUC, EIR, SM-SC) are replaced with ANSI-41 core network logical nodes (HLR/AC, MSC/VLR, MC/OTAF). Additionally, functions associated with the GSM dedicated mode RR (radio resources management) for circuit switched services are replaced by ANSI-136-based circuit switched radio access bearers and radio network concepts.

To achieve these co-existence and interworking requirements, the present invention defines a new ANSI-136 RR sub-layer which includes a new ANSI-136 medium access control (MAC) providing higher layer services to the GPRS LLC sub-layer.

The circuit switched core network functions consist of the ANSI-41/136 core network infrastructure with an ANSI-41 MSC/VLR, MC and HLR/SCP/AC.

A. At the CM Sub-Layer

At the CM sub-layer, there is a new mobile station type with capabilities to concurrently access both GPRS packet data service and ANSI-136 circuit switched services. The mobile station has the capability to gain access to both GPRS and ANSI-136 associated services while it is connected through the GPRS packet radio access network (camping on the PCCH). This mobile station type has associated call control, service interaction handling and teleservices handling performed within the ANSI-41 infrastructures. Transfer of service notification between the mobile station and the ANSI-41 MSC/VLR is subject to a mobility management clause at the MM sub-layer.

There is also a new mobile station type with capabilities to access packet switched services while connected through the packet radio access network. The mobile station has the capability to acquire ANSI-136 associated services while connected through the circuit switched radio access network (camping on the DCCH) only. These new mobile station types have PDP context associated procedures, and are supported through existing Session Management (SM) functions.

B. At the MM Sub-Layer:

At the MM sub-layer, the mobile station's GPRS service profile resides in the GPRS HLR. The mobile station's circuit switched service profile resides in the ANSI-41 HLR. For circuit switched purposes, location updates and subscriber profile updates for the mobile station are performed by the ANSI-41 HLR. When the mobile station operates in GPRS mode, associated ANSI-136 information is forwarded towards/from the associated infrastructures. For packet data purposes, location updates and subscriber data updates for the mobile station are provided by the GPRS HLR. GPRS packet data related security functions for mobile stations are also provided by the GPRS HLR. The execution of associated security functions still resides within the scope of the GPRS core network.

Authentication functions for circuit-switched purposes are performed by an ANSI-41 HLR/AC. Since data encryption is provided at the LLC sub-layer according to the GPRS packet data security functions, there is no need to provide ANSI-136 message encryption and privacy functions over the PDCH.

An optional interface (F1) is established between the ANSI-41 HLR/AC and the GPRS HLR/AUC for authentication synchronization between packet switched and circuit switched services. The GPRS HLR/AUC informs the ANSI-41 HLR/AC of its state of authentication. If the subscriber is successfully authenticated in the GPRS system, the ANSI-41 HLR and MSC/VLR do not expect the mobile station's AUTHR at non-call accesses. When the subscriber is active and authenticated in the GPRS system, the ANSI-41 HLR and MSC/VLR only invoke security functions for call accesses (originating and terminating).

The relationship described above between the GSM MSC/VLR and the GPRS serving node, is preserved to support similar mobility functions between the mobile station and the SGSN and the ANSI-41 MSC/VLR. Some mobility functions are supported through the existing Gs functional procedure. Other mobility functions and miscellaneous ANSI-136 signaling are supported through new signaling messages between the MSC/VLR and the GPRS serving node. GPRS signaling procedures use an IMSI-based MSID addressing scheme. ANSI-136 based signaling procedures use a MIN-based MSID addressing scheme.

C. At the RR Sub-Layer:

The ANSI-136 RR sub-layer has a shared mode and a dedicated mode specifying the overall radio network and access functions with management and traffic handling entities. These are implemented in the BS and ANSI-41 MSC/VLR. The ANSI-136 shared mode RR sub-layer is defined through a new ANSI-136-specific physical layer and MAC layer.

The shared mode RR management entity (RRME) of the radio network and access functions includes a BS air interface-specific component and a BS network component. The BS network component is implemented in an Interworking GPRS Base Station Controller (BSC) and in the ANSI-41 MSC/VLR. The ANSI-41 MSC/VLR component is merged with the existing dedicated mode RR management entity to (1) handle channel and timeslot configuration (spectrum management and channel management), (2) support GPRS and ANSI-136-specific channel management for DCCH and GPRS packet control channel selection and reselection, and (3) process other operation, administration, maintenance and parameters (OAM&P) packet broadcast control channel (PBCCH) information. A radio resource management interface (F3) may be provisioned between the Interworking GPRS BSC and the ANSI-41 MSC/VLR to coordinate the three management functionalities.

The ANSI-136 RR traffic handling entity of the radio network and access functions also has a BS air interface-specific component and a BS network-specific traffic handling component. The BS air interface-specific component handles the relay over the air interface MAC. The BS network-specific traffic handling component handles an equivalent Gb interface termination and provides a relay between the Gb interface and the BS. The network-specific component is implemented in the Interworking GPRS BSC which may be physically located at the BS or ANSI-41 MSC/VLR.

D. Description of Figures

Figure 1:
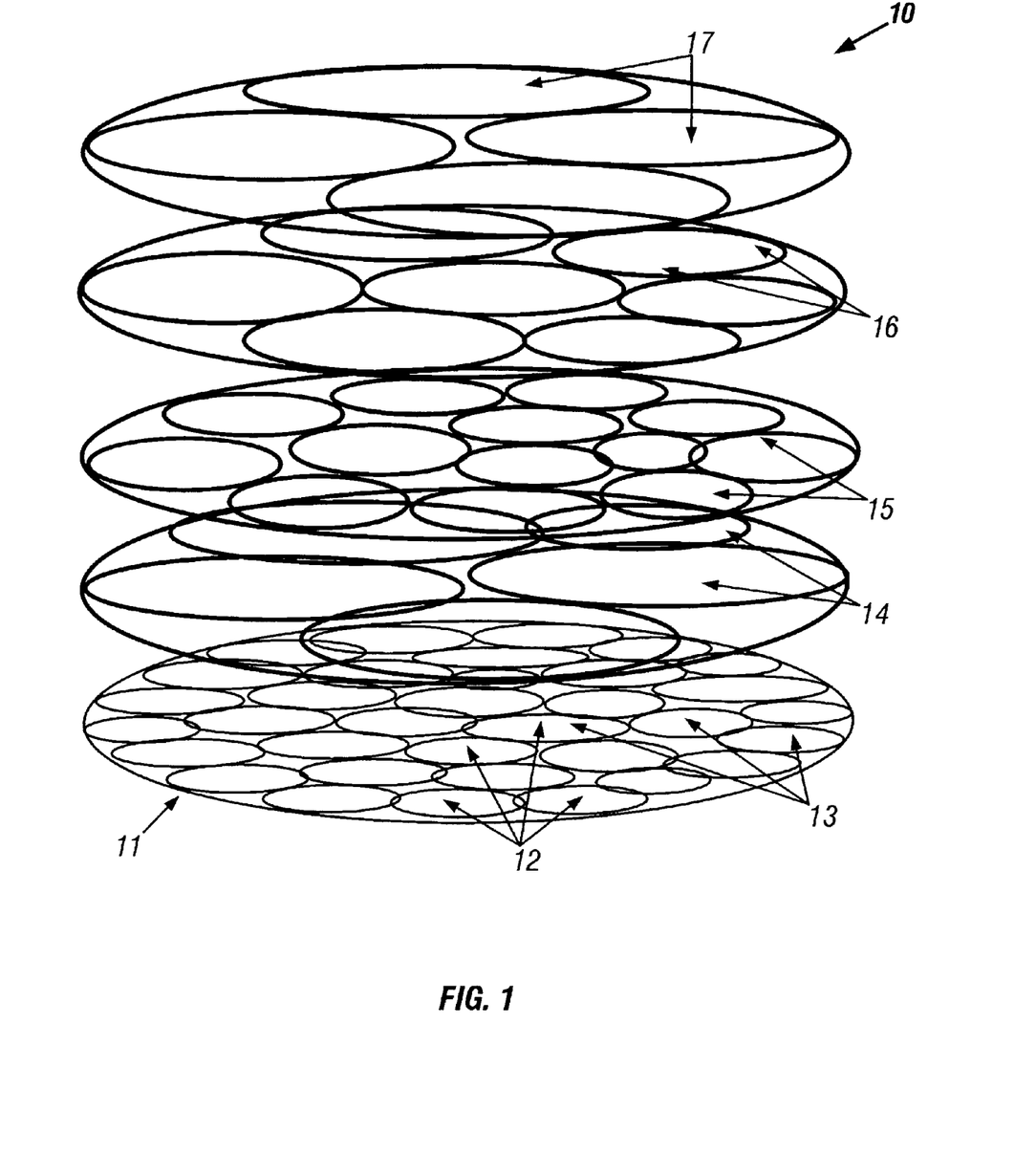
FIG. 1 is an illustrative drawing of an integrated radio network structure showing the relationship between various GPRS network areas and ANSI-41 network areas.

FIG. 1 is an illustrative drawing of a MSC/VLR's radio network structure 10 showing the relationship between various GPRS network areas and ANSI-41 network areas in an integrated GPRS/ANSI-41 network. Illustrated at the lowest level is a circuit switched MSC service/exchange area 11. The MSC service/exchange area is shown to be divided into a plurality of voice/circuit switched service cells 12 defining a voice/circuit switched service area, and a plurality of packet data service cells 13 defining a packet data service area.

A Serving GPRS Service Node (SGSN) service area 14 spanning a packet data service area may overlay a portion of one or more MSC service/exchange areas. As shown at the next level, the SGSN service area may be divided into a plurality of routing areas 15. Likewise, as shown in the next two levels, the MSC service/exchange area 11 spanning a voice/circuit switched service area may be divided into a plurality of location areas 16 and paging areas 17.

Figure 2:
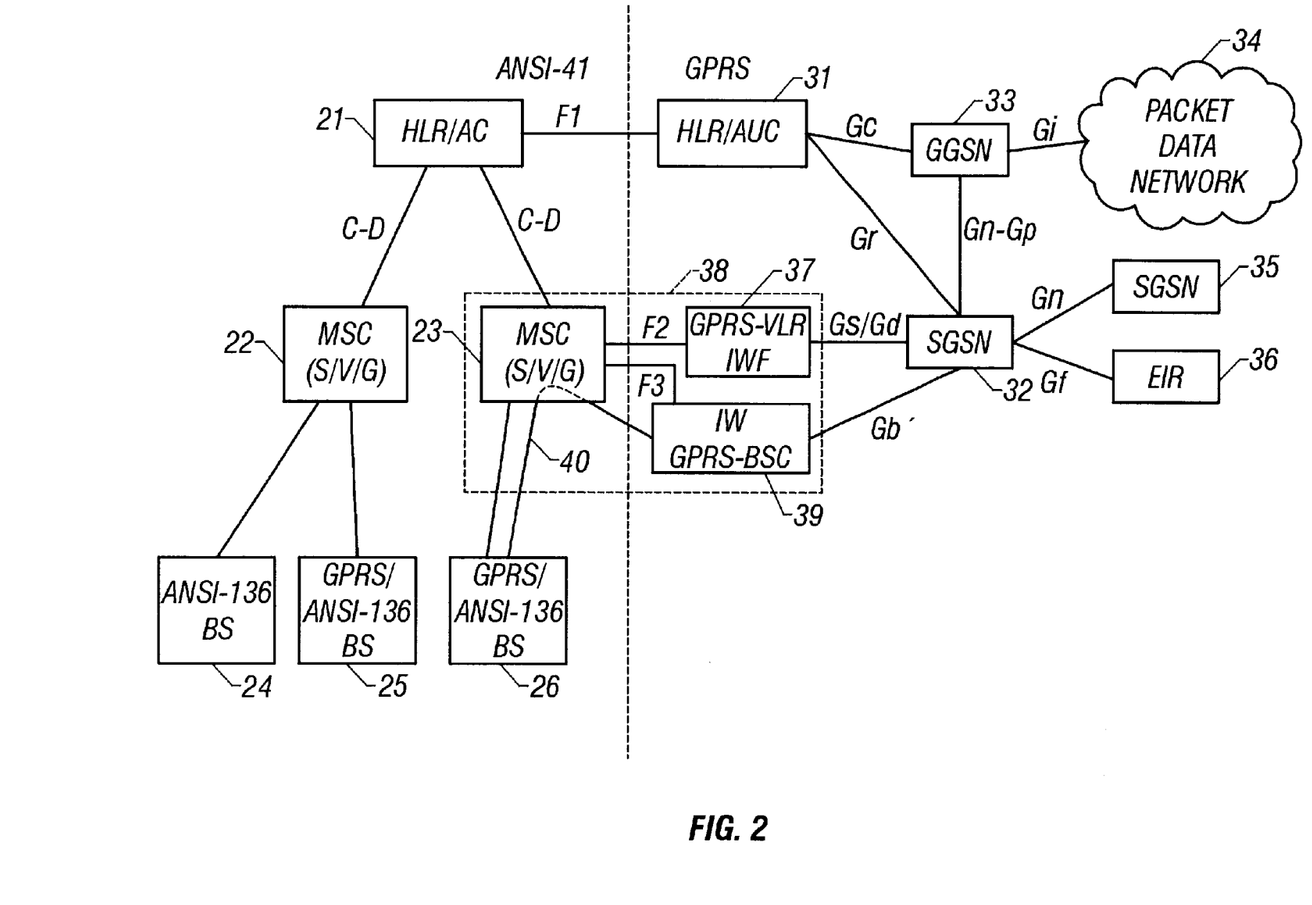
FIG. 2 is a simplified block diagram of an integrated GPRS/ANSI-41 network according to a first embodiment of the present invention.

FIG. 2 is a simplified block diagram of an integrated GPRS/ANSI-41 network according to a first embodiment of the present invention. On the ANSI-41 side of the network, there is an ANSI-41 Home Location Register/Authentication Center (HLR/AC) 21 which is connected by a C-D interface to MSC/VLRs 22 and 23. The MSC/VLRs are illustrated to be either Serving, Visitor, or Gateway (S/V/G) MSCs. The MSC/VLRs, in turn, are connected to Base Stations (BSs) 24–26. Within the ANSI-41 network, access to the GPRS packet data network may be provided over a subset of a MSC/VLR's service area; therefore, FIG. 2 shows MSC/VLR 22 controlling one standard ANSI-136 base station and one GPRS/ANSI-136 base station. BS 24 is shown to be an ANSI-136 base station while BS 25 and BS 26 are shown to be GPRS/ANSI-136 base stations. The GPRS/ANSI-136 base stations are ANSI-136 base stations that are GPRS capable.

On the GPRS side, there is a GPRS Home Location Register/Authentication Center (HLR/AUC) 31 which is connected by a Gr interface to a Serving GPRS Switching Node (SGSN) 32, and is connected by a Gc interface to a Gateway GPRS Switching Node (GGSN) 33. The GGSN is connected by a Gi interface to a Packet Data Network 34, and is connected by a Gn-Gp interface to the SGSN 32. The GGSN, which is the GPRS equivalent of an Internet access gateway, and its interfaces are reused without modification. The SGSN may be connected by a Gn interface to other SGSNs 35 in the GPRS network, and by a Gf interface to an Equipment Identity Register (EIR) 36. The Gn interface from the SGSN to other SGSNs in the GPRS network is reused without modification. Likewise, the Gf interface from the SGSN to the EIR is reused without modification.

To support the integration of voice and packet data services without integrating too much of the GPRS and ANSI-41 functions, an interface is needed between the circuit switched serving node (such as MSC/VLR 23) and the packet switched serving node (such as SGSN 32). The interface is provided by introducing a new F2 interface between the MSC/VLR and a GPRS Visitor Location Register-Interworking Function (GPRS-VLR IWF) 37. The GPRS-VLR IWF then maps the signaling from the MSC/VLR and interfaces with the SGSN via a Gs/Gd interface protocol. Thus, one aspect of the GPRS/ANSI-41 integration is to map the signaling between the circuit switched serving MSC/VLR and the GPRS standard Gs/Gd interfaces. With this approach, the MSC/VLR 23 and the SGSN 32 are decoupled as much as possible with the GPRS-VLR IWF 37 to translate between them. In the embodiment shown in FIG. 2, the dotted box 38 indicates a specific implementation of the MSC/VLR 23 and the GPRS-VLR IWF 37. If the GPRS-VLR IWF is integrated into the MSC/VLR, there is no F2 open interface.

There are different types of mobile stations, and some can have simultaneous access to circuit switched and packet data services. For those mobile stations, the default mode is to access the GPRS network and then inform the associated circuit switched network that the mobile station is active and registered in the GPRS network. When the mobile station registers with the GPRS network, the SGSN 32 informs the MSC/VLR 23 of the registration through the interface between them. When this information is received in the MSC/VLR, it triggers the location updating function in the circuit switched network, and the location is updated in the ANSI-41 HLR/AC 21.

An interface (Gb') is also needed between the SGSN 32 and the GPRS/ANSI-136 base station 26. This interface is a modification of the GPRS-specified interface (Gb) which interfaces the SGSN with the GSM base station subsystem (BSS) (not shown). An Interworking GPRS Base Station Controller (IW GPRS BSC) 39 logically provides the termination of the Gb' interface from the SGSN 32. The IW GPRS BSC may be physically located at the base station, but this is not mandatory. The Gb' interface supports GPRS-specific signaling and data passing between the mobile station and the SGSN (i.e., traffic) which needs to go through the IW GPRS BSC. A radio resource management interface (F3) is implemented to connect the MSC/VLR Radio Resource Management Entity (RRME) with an associated component in the IW GPRS BSC.

A traffic interface 40 is provided between the IW GPRS BSC 39 and the GPRS/ANSI-136 base station 26. From the IW GPRS BSC, there is a semi-permanent connection through the MSC/VLR 23 to carry traffic to the GPRS/ANSI-136 base station. The traffic interface is not standardized, and is proprietary to each manufacturer. Packet switched signaling is utilized between the SGSN and the mobile station via the IW GPRS BSC and the GPRS/ANSI-136 base station. A relay function adapts the signaling format from the Gb' interface to the air interface signaling format for use at the base station. Lower layers of the interface are also adapted. This may be accomplished by adaptation from a clear T1 to a channelized T1, or between a channelized T1 and digital cross connects (DXC). The clear T1 is not segmented into multiplexed DS0s while the channelized T1 is segmented into 24 multiplexed DS0s. Thus, between the SGSN 32 and the IW GPRS BSC 39, there may be one or more logical DS0s, and the IW GPRS BSC may perform DXC functions. From the IW GPRS BSC to the GPRS/ANSI-136 base station 26, there may be one or more fixed DS0s allocated on a semi-permanent basis.

There may also be a F1 interface between the ANSI-41 HLR/AC 21 and the GPRS HLR/AUC 31 to ensure that the authentication status of the mobile station is maintained in the reciprocal network while the mobile station is in either circuit switched service mode or packet data service mode. Authentication functions are typically performed upon first access to the network, and authentication data is passed over the F1 interface between the HLRs. Thus, if the authentication is performed by the GPRS HLR/AUC, the F1 interface is utilized to inform the ANSI-41 HLR/AC of the successful authentication.

When the mobile station is registered in both networks, it can receive circuit switched calls during a packet data transaction. Circuit switched calls to the mobile station are delivered to the circuit switched serving MSC/VLR 23 where the mobile station is currently registered. The MSC/VLR utilizes the F2 interface through the GPRS-VLR IWF 37 to request the SGSN 32 to page the mobile station in preparation for delivering the circuit switched call. The SGSN pages the mobile station in the known location. The mobile station then responds to the page, and this fact is passed back to the MSC/VLR. The call is then completed through the GPRS/ANSI-136 base station 26.

Radio access in the GPRS network is multiple access, so all the users are multiplexed onto one channel for packet data access. This makes more efficient use of air interface resources, and also allows switching from the packet data mode to the circuit switched mode, and vice versa. Thus, the mobile station can switch from the packet data mode to a circuit switched air interface traffic channel to receive a call. When the call is completed, the mobile station switches back to the packet data mode.

Figure 3:
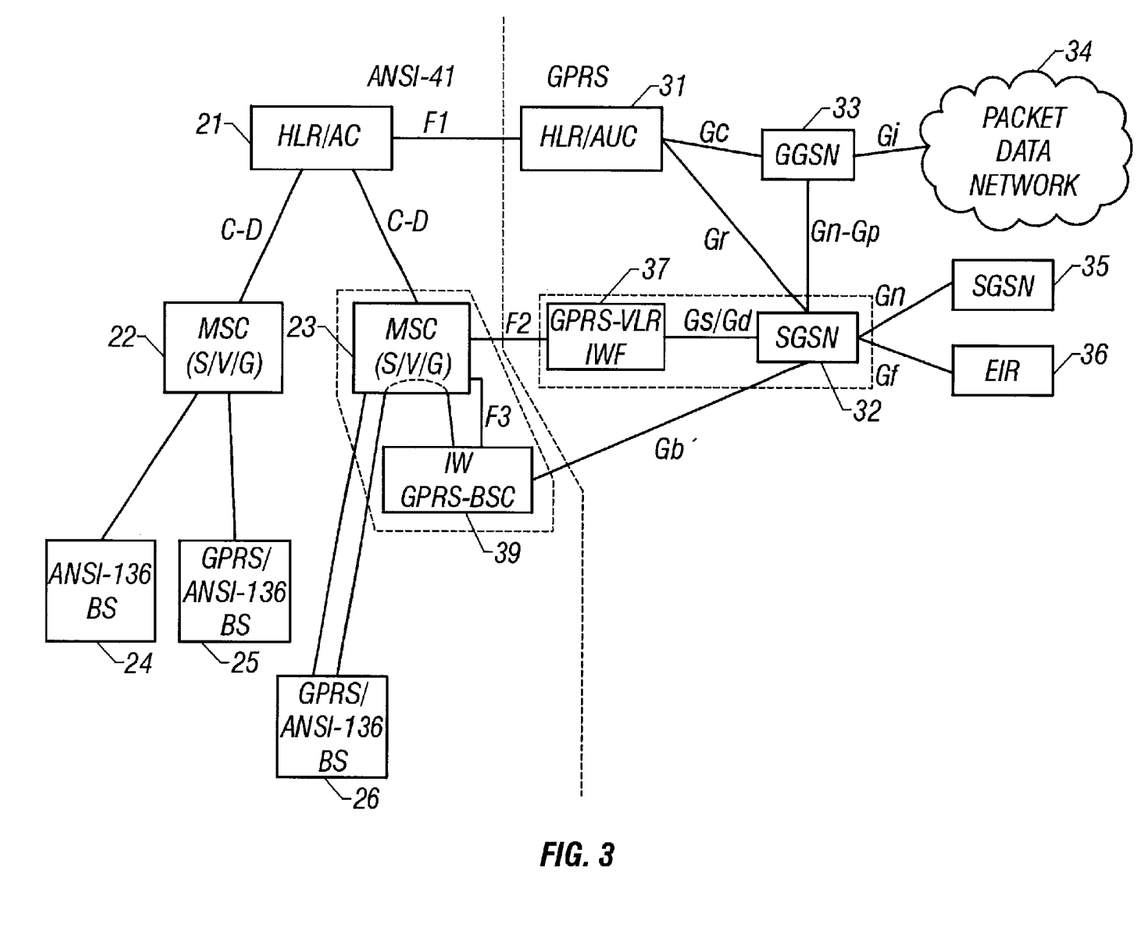
FIG. 3 is a simplified block diagram of an integrated GPRS/ANSI-41 network according to a second embodiment of the present invention.

FIG. 3 is a simplified block diagram of an integrated GPRS/ANSI-41 network according to a second embodiment of the present invention. In this embodiment, the GPRS-VLR IWF 37 is integrated with the SGSN 32 on the GPRS side of the interface. The IW GPRS BSC 39 is associated with the ANSI-41 network, and may be implemented with the MSC/VLR 23. The functionality described in relation to FIG. 2 remains the same.

Figure 4:
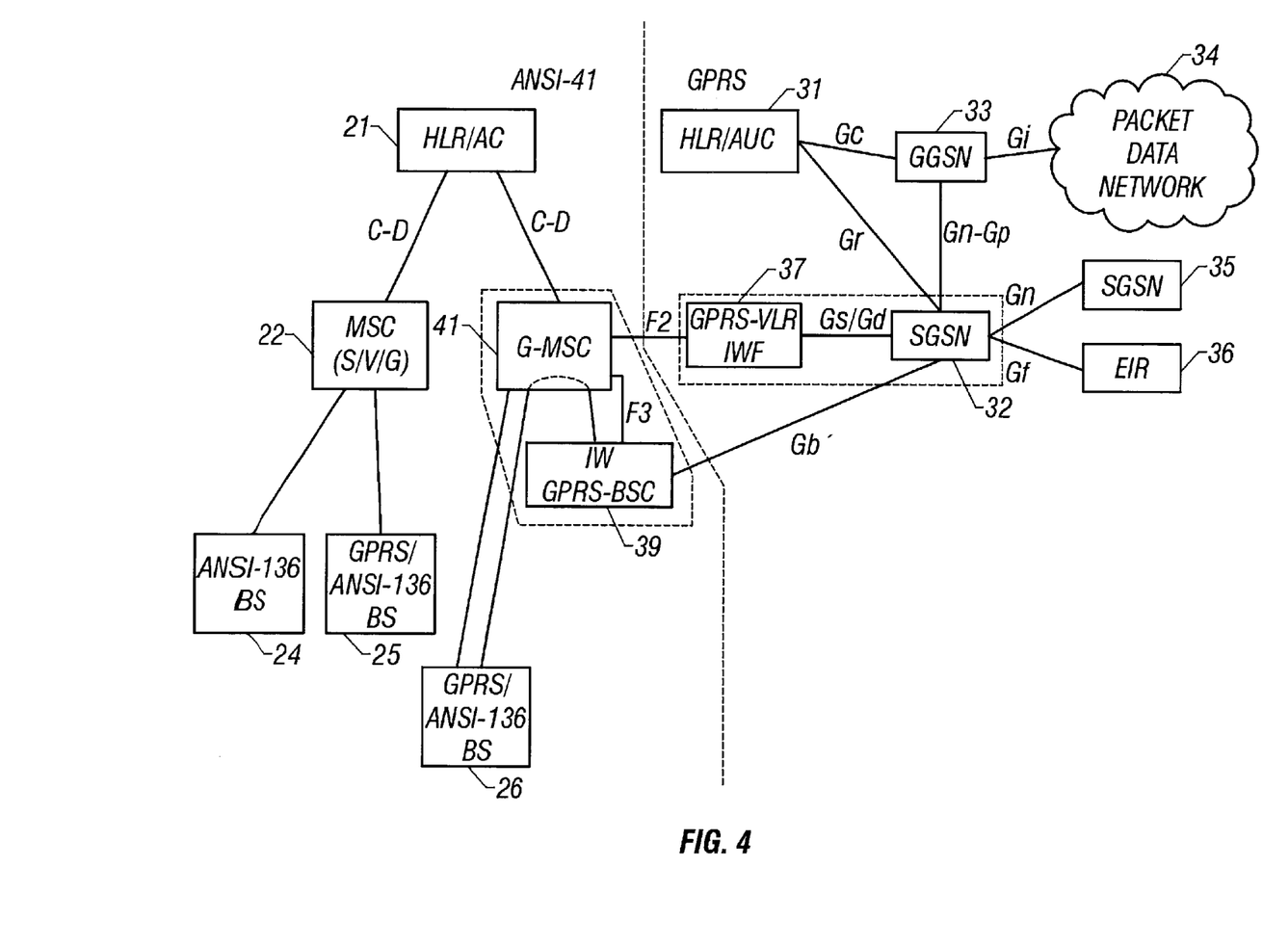
FIG. 4 is a simplified block diagram of an integrated GPRS/ANSI-41 network according to a third embodiment of the present invention.

FIG. 4 is a simplified block diagram of an integrated GPRS/ANSI-41 network according to a third embodiment of the present invention. In this embodiment, there is no F1 interface between the ANSI-41 HLR/AC 21 and the GPRS HLR/AUC 31. By modifying the ANSI-41 signaling, the ANSI-41 authentication center is informed upon initial registration and location update that the mobile station is making access on the GPRS network. The ANSI-41 HLR/AC may then defer authentication to the GPRS network until the mobile station changes back to the circuit switched network. When the mobile station makes access on the GPRS network the SGSN 32 is notified. If it is a location update type of access, the SGSN initiates the location update signaling to the associated ANSI-41 circuit switched Gateway MSC 41. The Gateway MSC, in turn, performs the location update towards the HLR/AC 21 with Authentication Request (AUTHREQ) and Registration Notification (REGNOT) messages. A new system access type is introduced with indicates that the mobile station has made an access on lie GPRS network control channel.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of integrating a circuit switched radio telecommunications network with a packet switched data network by using an interworking function, said circuit switched network having a circuit switched serving node, said circuit switched radio telecommunications network being an ANSI-41 radio telecommunications network wherein the circuit switched serving node is a mobile switching center (MSC), and said packet switched data network having a packet switched serving node and said packet switched data network being a General Packet Radio Service (GPRS) packet data network wherein the packet switched serving node is a serving GPRS switching node (SGSN), said interworking function being A GPRS-visitor location register interworking function (GPRS-VLR IWF), said method comprising the steps of:

defining an ANSI-136 radio resources management sublayer including a ANSI-136 medium access control (MAC) in the ANSI-41 radio telecommunications network for providing GPRS packet data network higher layer services;

providing a first interface between the MSC and the GPRS-VLR IWF;

mapping in the GPRS-VLR IWF, signaling from the MSC into signaling in a standard GPRS network protocol;

interfacing the mapped signaling with the SGSN utilizing a CPRS standard Gs/Gd interface;

connecting to the MSC, a GPRS/ANSI-136 base station which operates in accordance with both ANSI-136 standards and GPRS standards;

receiving in the MSC, a circuit switched call for a mobile station while the mobile station is involved in a GPRS packet data transaction;

utilizing, by the MSC, the first interface and the GPRS-VLR IWF to request the SGSN to page the mobile station;

paging the mobile station by the SGSN;

receiving in the SGSN, a page response from the mobile station;

informing the MSC that the page response was received from the mobile station; and completing the circuit switched call from t MSC to the mobile station through the GPRS/ANSI-136 base station.

2. The method of integrating a circuit switched radio telecommunications network and a packet switched data network of clam 1 further comprising the steps of:

providing a second interface to carry traffic and signaling between the SGSN and an interworking GPRS base station controller;

adapting in the interworking GPRS base station controller, a signaling format utilized on the second interface into an air interface signaling format;

providing a traffic interface to carry the traffic and adapted signaling between the interworking GPRS base station controller and the GPRS/ANSI-136 base station.

3. The method of integrating a circuit switched radio telecommunications network and a packet switched data network of claim 2 wherein the step of providing a traffic interface includes providing a semi-permanent correction through the MSC.

4. The method of integrating a circuit switched radio telecommunications network and a packet switched data network of claim 3 further comprising implementing a radio resource management interface between the interworking GPRS base station controller and the MSC, said radio resource management interface coordinating radio resource management functions between the interworking GPRS base station controller and the MSC.

5. The method of integrating a circuit switched radio telecommunications network and a packet switched data network of claim 4 wherein the ANSI-41 network also includes an ANSI-41 home location register/authentication center HLR/AC) and the GPRS network includes a GPRS home location register/authentication center (HLR/AUC), and the method further comprises the steps of:

providing an authentication center interface between the ANSI-41 HLR/AC and the GPRS HLR/AUC; and sending the authentication state of the mobile station operating in both the ANSI-41 network and the GPRS network between the ANSI-41 HLR/AC and the GPRS HLR/AUC utilizing the authentication center interface.

6. The method of integrating a circuit switched radio telecommunications network and a packet switched data network of claim 4 wherein the ANSI-41 network also includes an ANSI-41 home location register/authentication center (HLR/AC) and the GPRS network includes a GPRS home location register/authentication center (HLR/AUC), and a mobile station is operating in both the ANSI-41 network and the GPRS network, the method further comprising the steps of:

determining that the mobile station is registering or performing a location update in the GPRS network;

informing the ANSI-41 HLR/AC that the mobile station is making access on the GPRS network; and deferring by the ANSI-41 HLR/AC, authentication of the mobile station to the GPRS HLR/AUC.

7. The method of integrating a circuit switched radio telecommunications network and a packet switched data network of claim 4 wherein the ANSI-41 network also includes an ANSI-41 home location register/authentication center (HLR/AC) and the GPRS network includes a GPRS home location register/authentication center (HLR/AUC), and a mobile station is operating in both the ANSI-41 network and the GPRS network, the method further comprising the steps of:

determining that the mobile station is performing a location update in the GPRS network;

notifying the SGSN of the location update;

utilizing, by the SGSN, the GPRS-VLR interworking function and the first interface to inform the MSC that the mobile station is performing a location update in the GPRS network; and informing, by the MSC, the ANSI-41 HLR/AC of the location update.

8. The method of integrating a circuit switched radio telecommunications network and a packet switched data network of claim 3 further comprising the step of integrating the interworking GPRS base station controller with the MSC.

9. The method of integrating a circuit switched radio telecommunications network and a packet switched data network of claim 1 further comprising the step of integrating the GPRS-VLR interworking function with the MSC.

10. The method of integrating a circuit switched radio telecommunications network and a packet switched data network of claim 1 further comprising the step of integrating the GPRS-VLR interworking function with the SGSN.

* * * * *